No. 12,567. REISSUED NOV. 27, 1906.

E. G. CASE.

ABRASIVE BODY AND METHOD OF MAKING THE SAME.

APPLICATION FILED JUNE 26, 1906.

Witnesses:
Chas. H. Potter.
Julia B. Hill

Inventor:
Edson G. Case,
by Byrnes & Townsend
Att'ys.

UNITED STATES PATENT OFFICE.

EDSON G. CASE, OF NIAGARA FALLS, NEW YORK.

ABRASIVE BODY AND METHOD OF MAKING THE SAME.

No. 12,567. Specification of Reissued Letters Patent. Reissued Nov. 27, 1906.

Original No. 779,639, dated January 10, 1905. Application for reissue filed June 26, 1906. Serial No. 323,535.

*To all whom it may concern:*

Be it known that I, EDSON G. CASE, of Niagara Falls, in the county of Niagara, in the State of New York, have invented a new and useful Abrasive Body and Method of Making the Same, of which the following is a specification.

This invention relates to an improved method of fastening an abrasive material to the surface or surfaces of suitable bodies to form articles which are adapted to be used for grinding or polishing other surfaces or bodies, and to the article thereby produced.

The object of the invention is to provide an abrasive surface which is practically inherent in the body to which it is applied, whereby the wearing qualities and permanency of the grinding or polishing surface is materially increased.

To this end the invention consists, essentially, in applying an abrasive substance—such as carborundum, emery, or equivalent material—to the surface or surfaces of a suitable body and subjecting said body to an electroplating process, whereby a metal coating or plating is deposited over and around the surfaces of the abrasive material and suitable body and permanently fixes the abrasive material to said body, it being understood that under this treatment the abrasive particles become embedded in and fastened by the plating, producing thereby an article having the characteristics above described.

Figure 1:
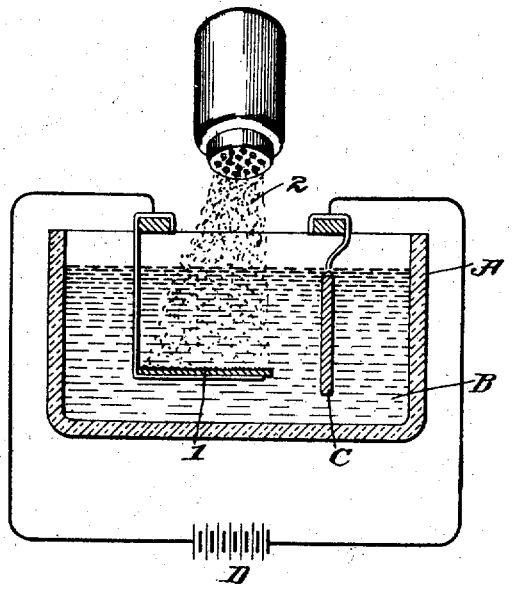
Figure 2:
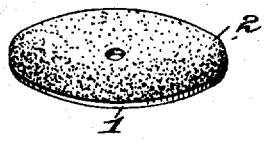

In the drawings, Figure 1 is a sectional view of an electroplating apparatus, showing one manner of applying the abrasive material to the part being plated; and Fig. 2 is a metal disk 1, having an abrasive substance 2 applied and fixed thereto according to my improved method.

In carrying out the objects stated, I employ any well-known form of electroplating apparatus, as A, containing a suitable electrolyte B, in which the metal anode, as C, and the object, as 1, which is to receive the abrasive substance and plating, are immersed and electrically connected to a source of electrical energy, as D, in the manner usual for electroplating.

During the electrolytic action, by which the plating metal is deposited upon the surface or surfaces of the object, the abrasive substance, such as powdered or granulated carborundum or emery or similar material, is sifted or otherwise deposited into the electrolyte and falls upon the surface of the object, which is supported in such position that the abrasive substance is uniformly distributed over the surface to be prepared. It is evident, however, that this abrasive substance may be applied before immersion or before the electrolytic action begins, the only requirement being that this abrasive material be in position on the object while the plating metal is being deposited on the body or object, so that the abrasive particles become embedded and fastened thereon and thereby.

Having thus described my invention, what I claim, and desire to secure by Letters Patent, is—

1. The herein-described method of making grinding and polishing surfaces upon suitable bodies, said method consisting in distributing a powdered or granulated abrasive material over the surface of the body and at the same time electroplating the body and abrasive material while the latter is being distributed on the body whereby the plating metal is deposited over and around the surface of the body and abrasive powder to permanently fix the latter to the body.

2. The herein-described method of fastening abrasive material to suitable bodies, which consists in distributing a powdered or granulated abrasive material over the surface of the body, and electrodepositing metal over and around the surface of the body and abrasive material to permanently fix the latter to the body.

3. The herein-described new article of manufacture, comprising a suitable body, a powdered or granulated abrasive material upon the surface thereof, and an electrodeposited plating over and around the surface of the body and abrasive material and permanently fixing the latter to the body.

4. The herein-described new article of manufacture, comprising a metallic disk, a powdered or granulated abrasive material upon the surface thereof, and an electrodeposited plating over and around the surface of the disk and abrasive material and permanently fixing the latter to the disk.

In testimony whereof I affix my signature in the presence of two witnesses.

EDSON G. CASE.

Witnesses:
GEO. W. PRINGLE,
D. F. BENTLEY.